(12) United States Patent
Shimizu et al.

(10) Patent No.: US 11,742,950 B2
(45) Date of Patent: Aug. 29, 2023

(54) WAVELENGTH DISPERSION AMOUNT CALCULATION APPARATUS AND WAVELENGTH DISPERSION AMOUNT CALCULATION METHOD

(71) Applicant: NIPPON TELEGRAPH AND TELEPHONE CORPORATION, Tokyo (JP)

(72) Inventors: Shimpei Shimizu, Musashino (JP); Takayuki Kobayashi, Musashino (JP); Masanori Nakamura, Musashino (JP); Yutaka Miyamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/777,569

(22) PCT Filed: Nov. 28, 2019

(86) PCT No.: PCT/JP2019/046491
§ 371 (c)(1),
(2) Date: May 17, 2022

(87) PCT Pub. No.: WO2021/106126
PCT Pub. Date: Jun. 3, 2021

(65) Prior Publication Data
US 2022/0407600 A1    Dec. 22, 2022

(51) Int. Cl.
*H04B 10/61*    (2013.01)
*H04B 10/2513*    (2013.01)
*H04B 10/079*    (2013.01)

(52) U.S. Cl.
CPC ... *H04B 10/2513* (2013.01); *H04B 10/07951* (2013.01); *H04B 10/6161* (2013.01)

(58) Field of Classification Search
None
See application file for complete search history.

(56) References Cited

U.S. PATENT DOCUMENTS 6,865,348 B2 * 3/2005 Miyamoto ......... H04B 10/5055
398/189
8,861,979 B2 * 10/2014 Liu ................. H04B 10/25133
398/208

(Continued)

FOREIGN PATENT DOCUMENTS

BR    102014017868 A2 *    2/2016    ......... H04B 10/6161

OTHER PUBLICATIONS

Dawei Wang et al., Adaptive Chromatic Dispersion Compensation for Coherent Communication Systems Using Delay-Tap Sampling Technique, IEEE Photonics Technology Letters, vol. 23, No. 14, 2011, pp. 1016-1018.

*Primary Examiner* — Jai M Lee
(74) *Attorney, Agent, or Firm* — Harness, Dickey & Pierce, P.L.C.

(57) ABSTRACT

A computation unit uses an assumed chromatic dispersion amount to compensate for dispersion of a coherently received optical signal and performs arithmetic of a signal power of the optical signal that is dispersion compensated. The computation unit performs computation of an evaluation function when a signal power and a delayed signal power obtained by applying a predetermined delay to the signal power satisfy a threshold condition. The evaluation function is a function for evaluating whether the assumed chromatic dispersion amount is a chromatic dispersion amount of the optical signal using the difference between the signal power and the delayed signal power. The chromatic dispersion amount calculation unit calculates a chromatic dispersion amount of the optical signal based on the com- (Continued)

putation result of the evaluation function by the computation unit when each of a plurality of different assumed chromatic dispersion amounts is used.

6 Claims, 8 Drawing Sheets

(56) References Cited

U.S. PATENT DOCUMENTS

| | | | | |
|---|---|---|---|---|
| 9,331,783 B2* | 5/2016 | Simonneau | ......... | H04J 14/0212 |
| 9,621,299 B2* | 4/2017 | Ishihara | ............. | H04B 10/6161 |
| 10,361,779 B2* | 7/2019 | Arikawa | ............ | H04B 10/2513 |
| 10,868,617 B2* | 12/2020 | Yoshida | ........... | H04B 10/25133 |
| 2009/0238578 A1* | 9/2009 | Taylor | ................ | H04B 10/6972 |
| | | | | 398/147 |

* cited by examiner

WAVELENGTH DISPERSION AMOUNT CALCULATION APPARATUS AND WAVELENGTH DISPERSION AMOUNT CALCULATION METHOD

CROSS-REFERENCE TO RELATED APPLICATIONS

This application is a 371 U.S. National Phase of International Application No. PCT/JP2019/046491, filed on Nov. 28, 2019. The entire disclosure of the above application is incorporated herein by reference.

TECHNICAL FIELD

The present disclosure relates to a chromatic dispersion amount calculation apparatus and a chromatic dispersion amount calculation method.

BACKGROUND ART

A digital coherent optical transmission system using a coherent reception technique and digital signal processing in combination has become widespread for current backbone optical transmission networks. One feature of digital coherent optical transmission is that chromatic dispersion of a signal can be compensated for in digital signal processing after reception thereof "Chromatic dispersion" refers to the occurrence of a group velocity delay of wavelength components because the refractive index of optical fibers has wavelength dependency. When chromatic dispersion occurs, optical pulses overlap temporally, and thus inter-symbol interference degrades the transmission quality. Prior to digital coherent transmission, a technique of offsetting chromatic dispersion using two types of optical fibers with the different signs of chromatic dispersion coefficients (dispersion compensation transmission line) was used. On the other hand, in digital coherent optical transmission, accumulated chromatic dispersion can be compensated for at once after reception of the signal. This enables high transmission quality without a dispersion compensation transmission line.

In general, a chromatic dispersion amount of optical signals received through various optical nodes and disparate optical fibers is unknown. For this reason, when chromatic dispersion is compensated for using digital signal processing, a chromatic dispersion estimation technique for estimating the magnitude of the compensation is needed. Techniques for estimating dispersion using known signals inserted at the beginning or in the middle of a transmitted data sequence or inserted between chromatic channels have been proposed so far. However, these techniques have the problem that overheads are incurred by the amount of the known signals. Thus, blind estimation techniques that estimates a dispersion amount without known signals have been developed.

One of the blind estimation techniques is a delay-tap sampling estimation method (see, for example, NPL 1). In this technique, chromatic dispersion compensation in which a temporary chromatic dispersion amount X is assumed for a signal sequence E(t) received at a time t is performed. Then, an evaluation function using the correlation between a power $P_X(t)$ of a sample sequence $E_X(t)$ after compensation and a power $P_X(t-\tau)$ of $E_X(t-\tau)$ obtained by applying a delay for several samples to $E_X(t)$ is used. For example, a function using a difference between the power $P_X(t)$ and the power $P_X(t-\tau)$ is assumed as an evaluation function F(X) as shown in Equation (1) below.

[Math. 1]

$$F(X)=\Sigma|P_X(t)-P_X(t-\tau)|^2 \qquad (1)$$

Figure 8:
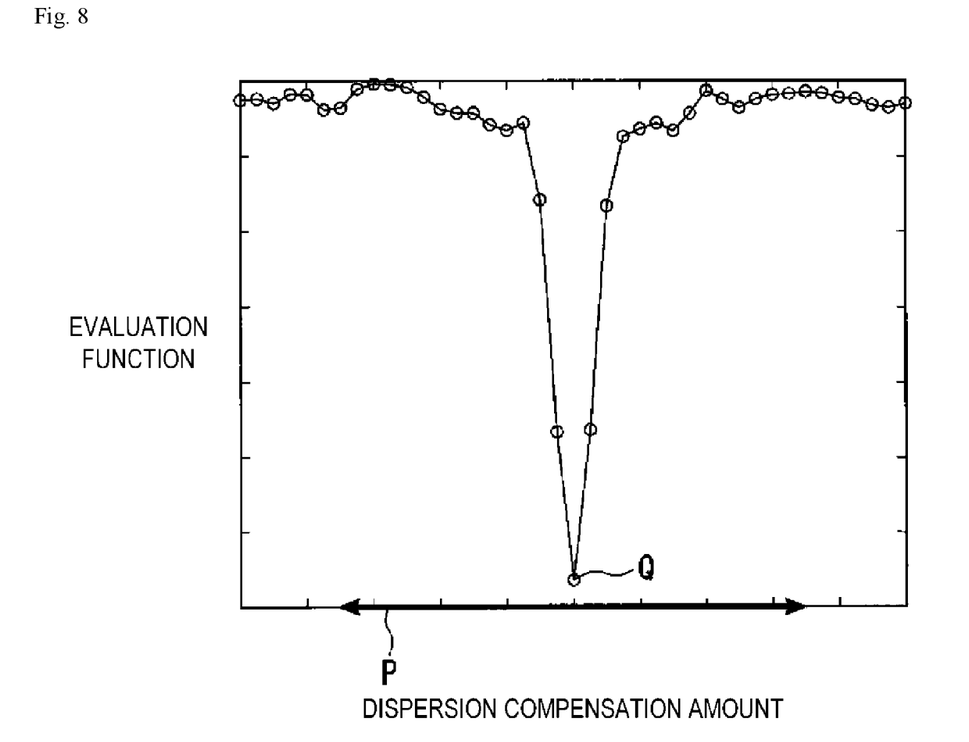
FIG. 8 is a diagram for explaining a chromatic dispersion amount estimation method.

In the delay-tap sampling method, a true chromatic dispersion amount is estimated by sweeping the temporary chromatic dispersion amount X in a suitable range. FIG. 8 is a diagram showing a chromatic dispersion amount estimation method. FIG. 8 shows a relationship between a chromatic dispersion amount X and a value of the evaluation function F(X). The symbol P denotes the sweep range of the temporary chromatic dispersion amount X. When the temporary chromatic dispersion amount X is close to a correct dispersion compensation amount, a shift in symbols of $E_X(t)$ and $E_X(t-\tau)$ does not occur. For this reason, the difference in powers becomes small, and as a result, the value of the evaluation function F decreases. Therefore, the chromatic dispersion amount X when the evaluation function F(X) has a minimum value as indicated by the reference sign Q is an estimated true chromatic dispersion amount.

CITATION LIST

Non Patent Literature

NPL 1: D. Wang, et al., "Adaptive Chromatic Dispersion Compensation for Coherent Communication Systems Using Delay-Tap Sampling Technique", IEEE Photonics Technology Letters, 2011, Vol. 23, No. 14, pp. 1016-1018

SUMMARY OF THE INVENTION

Technical Problem

In blind chromatic dispersion estimation using delay-tap sampling estimation, when a peak-to-average power ratio (PAPR) of a signal to be estimated, for example, a probabilistic shaping signal, is high, fluctuation of the power associated with transitions between symbols becomes more abrupt compared to an average power. In this case, the above-described tendency of the evaluation function is difficult to find, and accuracy in dispersion estimation deteriorates.

Taking the above-described circumstances into account, an objective of the present disclosure is to provide a chromatic dispersion amount calculation apparatus and a chromatic dispersion amount calculation method capable of accurately estimating chromatic dispersion with respect to a signal sequence with a high PAPR.

Means for Solving the Problem

An aspect of the present disclosure is a chromatic dispersion amount calculation apparatus including a computation unit that uses a difference between a signal power of an optical signal that is dispersion compensated with an assumed chromatic dispersion amount that is a chromatic dispersion amount assumed and a delayed signal power obtained by applying a delay to the signal power to compute an evaluation function for evaluating whether the assumed chromatic dispersion amount is a chromatic dispersion amount of the optical signal, and a chromatic dispersion amount calculation unit that calculates a chromatic dispersion amount of the optical signal based on computation results of the evaluation function by the computation unit when a plurality of the assumed chromatic dispersion amounts that differ from each other are used, in which the computation unit includes a dispersion compensation unit that performs dispersion compensation on a coherently received optical signal with the assumed chromatic dispersion amount, a power arithmetic unit that performs arithmetic of the signal power of the optical signal that is dispersion compensated, a delay applying unit that performs arithmetic of the delayed signal power obtained by applying a predetermined delay to the signal power, a threshold determination unit that determines whether the signal power and the delayed signal power satisfy a threshold condition, a computation availability determination unit that determines whether computation of the evaluation function is to be performed based on a determination of the threshold determination unit, and an evaluation function computation unit that performs computation of the evaluation function by using the signal power and the delayed signal power when the computation availability determination unit determines that the computation is to be performed.

Another aspect of the present disclosure is a chromatic dispersion amount calculation method including using a difference between a signal power of an optical signal that is dispersion compensated with an assumed chromatic dispersion amount that is a chromatic dispersion amount assumed and a delayed signal power obtained by applying a delay to the signal power to compute an evaluation function for evaluating whether the assumed chromatic dispersion amount is a chromatic dispersion amount of the optical signal, and calculating a chromatic dispersion amount of the optical signal based on computation results of the evaluation function in the using when a plurality of the assumed chromatic dispersion amounts that differ from each other are used, in which the using includes performing dispersion compensation on a coherently received optical signal with the assumed chromatic dispersion amount, performing arithmetic of the signal power of the optical signal that is dispersion compensated, performing arithmetic of the delayed signal power obtained by applying a predetermined delay to the signal power, determining whether the signal power and the delayed signal power satisfy a threshold condition, determining whether computation of the evaluation function is to be performed based on a determination in the determining whether the signal power and the delayed signal power satisfy a threshold condition, and performing computation of the evaluation function by using the signal power and the delayed signal power when the computation is determined to be performed in the determining whether computation of the evaluation function is to be performed.

Effects of the Invention

According to the present disclosure, it is possible to accurately estimate chromatic dispersion with respect to a signal sequence with a high PAPR.

DESCRIPTION OF EMBODIMENTS

Hereinafter, an embodiment of the present disclosure will be described in detail with reference to the drawings. This embodiment relates to a chromatic dispersion estimation method using delay-tap sampling estimation on a signal with a high PAPR, including a probabilistic shaping signal. In the delay-tap sampling estimation method, a chromatic dispersion amount is calculated using a correlation between the power of a received signal detected by an optical signal reception apparatus and the power of a delayed signal obtained by delaying the received signal by a predetermined time. When the delay-tap sampling estimation method is performed, the chromatic dispersion amount calculation apparatus of the present embodiment applies threshold processing to the power values of the samples of the received signal and the delayed signal.

Figure 1:
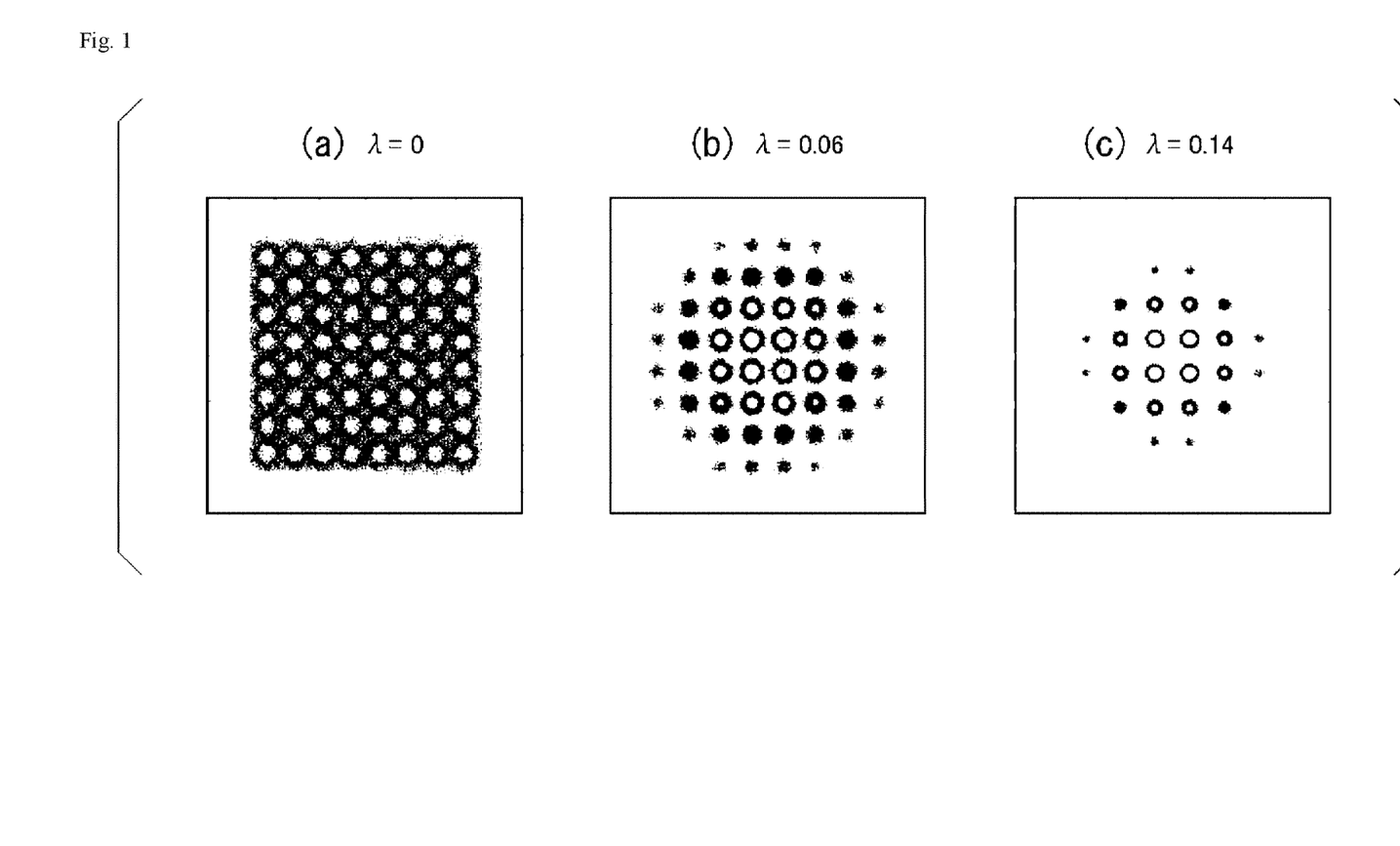
FIG. 1 is a signal distribution diagram of signals to be verified according to an embodiment of the present disclosure.

FIG. 1 is a signal distribution diagram of probabilistic shaping signals. In probabilistic shaping, an amount of information is maximized by making an appearance frequency of symbol points conform to the Maxwell-Boltzmann distribution. The Maxwell-Boltzmann distribution is expressed by Equation (2) below.

[Math. 2]

$$P(x) = \frac{e^{-\lambda x^2}}{\Sigma e^{-\lambda x'^2}} \quad (2)$$

λ represents a rate parameter. The rate parameter is a parameter that determines an amount of mutual information of signals. FIGS. 1(a) to 1(c) show signal distribution diagrams of 64 quadrature amplitude modulation (QAM) signals in cases in which λ is equal to 0, 0.06, and 0.14, respectively. A symbol that is closer to the center of the signal distribution diagram (constellation) has a lower power, and a symbol that is farther from the center has a higher power.

In the case in which λ is equal to 0, the symbols are normal QAM signals as shown in FIG. 1(a). In other words, the appearance probabilities of all the symbols are approximately the same. Thus, regardless of powers of the signals, a state transition from one symbol to another symbol occurs at approximately an equal probability. On the other hand, as λ has a greater value, a symbol located on an outer side in the symbol distribution, that is a symbol with a higher power, has a lower occurrence probability, and thus the PAPR tends to increase. Therefore, in the case of a high PAPR, a transition between a low-power symbol and a high-power symbol is rare compared to a transition between low-power symbols.

Figure 2:
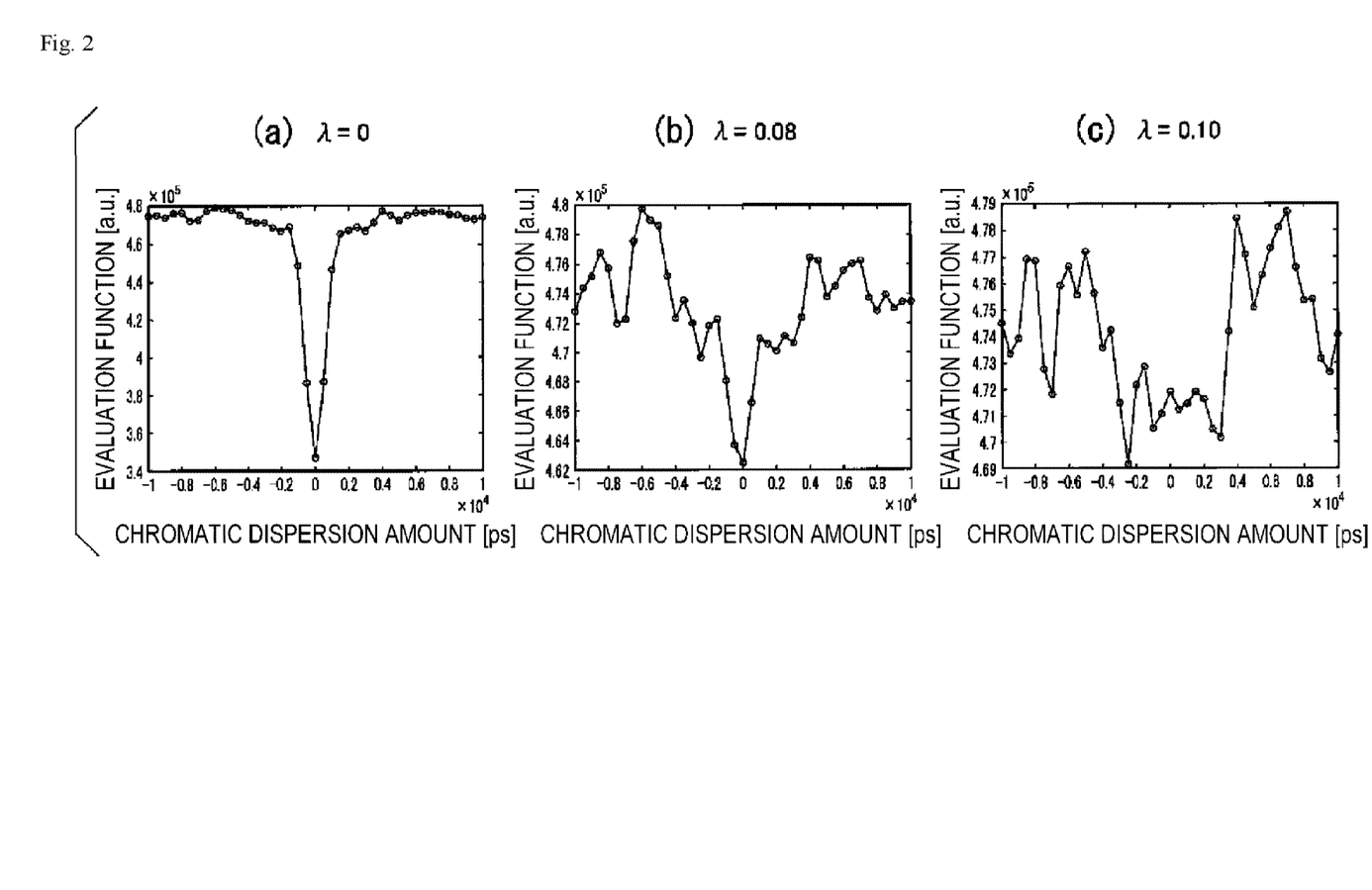
FIG. 2 is a diagram showing results of the delay-tap sampling estimation method applied to the signals to be verified according to the embodiment.

FIG. 2 is a diagram showing results of the delay-tap sampling estimation method applied to the signals. FIGS.

2(a) to 2(c) show the relationship between a value of the chromatic dispersion amount X and a value of the evaluation function F(X) of Equation (1) when the delay-tap sampling estimation method is applied to the probabilistic shaping 64-QAM signals in the cases in which λ is equal to 0, 0.08, and 0.10, respectively. Here, a true chromatic dispersion amount of each signal is 0 picoseconds (ps). In the case in which λ is equal to 0, that is, the signals are normal 64-QAM signals, the evaluation function F(X) when X is equal to 0 has a minimum value as shown in FIG. 2(a). Thus, it is seen that the chromatic dispersion can be estimated accurately. On the other hand, as 2 increases more, the PAPR of the signals becomes higher. When the PAPR becomes higher, it is difficult to determine a desired minimum peak due to instability of the evaluation function caused by abrupt fluctuation of power. For this reason, it can be ascertained that, in the case in which λ is equal to 0.10, the evaluation function F(X) has a minimum value when a dispersion compensation amount is incorrect as shown in FIG. 2(c).

Thus, in the present embodiment, as will be described below, a threshold is provided for a signal power when an evaluation function is obtained. In other words, only samples that are subject to a state transition within a predetermined threshold or outside the predetermined threshold are extracted to perform arithmetic of the evaluation function. Thus, the influence of a high PAPR is curbed. In the present embodiment, the evaluation function F(X) of Equation (3) or Equation (4) below is used.

[Math. 3]

$$F(X) = \Sigma_{P_X < P_{th}} |P_X(t) - P_X(t-\tau)|^2 \quad (3)$$

[Math. 4]

$$F(X) = \Sigma_{P_X > P_{th}} |P_X(t) - P_X(t-\tau)|^2 \quad (4)$$

Further, X represents a chromatic dispersion amount, and t represents a time. $P_X(t)$ represents a power of a sample sequence $E_X(t)$ in which chromatic dispersion compensation of the chromatic dispersion amount X has been performed on a received signal sequence E(t) at a time t. $P_X(t-\tau)$ represents a power of $E_X(t-\tau)$ obtained by applying a delay τ for several samples to $E_X(t)$. $P_{th}$ represents a threshold.

Figure 3:
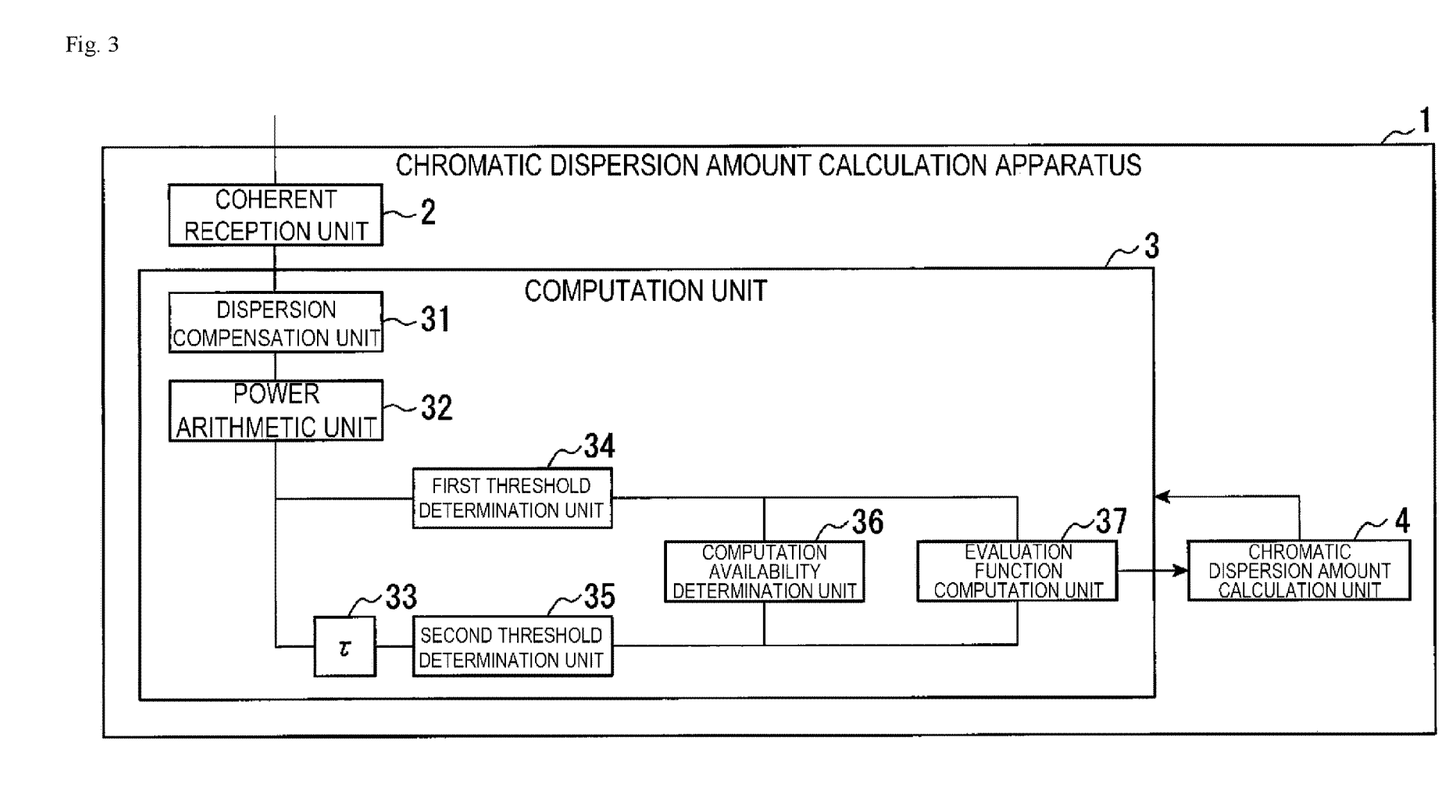
FIG. 3 is a block diagram illustrating a chromatic dispersion amount calculation apparatus according to the embodiment.

FIG. 3 is a block diagram illustrating a configuration of a chromatic dispersion amount calculation apparatus 1 according to the present embodiment. The chromatic dispersion amount calculation apparatus 1 includes a coherent reception unit 2, a computation unit 3, and a chromatic dispersion amount calculation unit 4. The coherent reception unit 2 coherently receives optical signals and outputs a received signal sequence E(t) obtained by performing digital signal processing. Further, the coherent reception unit 2 may be provided outside the chromatic dispersion amount calculation apparatus 1.

The computation unit 3 computes an evaluation function for each of different chromatic dispersion amounts X. The computation unit 3 includes a dispersion compensation unit 31, a power arithmetic unit 32, a delay applying unit 33, a first threshold determination unit 34, a second threshold determination unit 35, a computation availability determination unit 36, and an evaluation function computation unit 37.

The dispersion compensation unit 31 performs dispersion compensation on the electric field of the received signal sequence E(t) output by the coherent reception unit 2 using the chromatic dispersion amount X to obtain a sample sequence $E_X(t)$. The power arithmetic unit 32 performs arithmetic of the signal power $P_X(t)$ of the sample sequence $E_X(t)$ of the optical signal of which dispersion has been compensated for by the dispersion compensation unit 31. The delay applying unit 33 applies a delay τ for several samples to arithmetic result of the signal power $P_X(t)$ performed by the power arithmetic unit 32, and performs arithmetic of a delayed signal power $P_X(t-\tau)$.

The first threshold determination unit 34 determines whether each sample of arithmetic result of the signal power $P_X(t)$ performed by the power arithmetic unit 32 satisfies a threshold condition. The threshold condition is a first threshold condition that a power is less than or equal to a first threshold Pth or a second threshold condition that a power is equal to or greater than a second threshold Pth. The first threshold Pth and the second threshold Pth may be different values or may be the same value.

The second threshold determination unit 35 determines whether each sample of arithmetic result of the delayed signal power performed by the delay applying unit 33 satisfies a threshold condition. The threshold condition is the same as the threshold condition of the first threshold determination unit 34. In other words, in a case in which the first threshold determination unit 34 uses the first threshold condition that a power is less than or equal to the first threshold Pth, the second threshold determination unit 35 also uses the first threshold condition that a power is less than or equal to the first threshold Pth. In a case in which the first threshold determination unit 34 uses the second threshold condition that a power is equal to or greater than the second threshold Pth, the second threshold determination unit 35 also uses the second threshold condition that a power is equal to or greater than the second threshold Pth. Further, the first threshold condition may be a condition that a power is less than the first threshold Pth, and the second threshold condition may be a condition that a power exceeds the second threshold Pth.

The computation availability determination unit 36 determines whether computation of the evaluation function is to be performed based the determination result from the first threshold determination unit 34 and the determination result from the second threshold determination unit 35. In other words, when the sample of the signal power satisfies the threshold condition and the sample of the delayed signal power satisfies the threshold condition at the same time, the computation availability determination unit 36 determines that computation of the evaluation function is to be performed for the time. When at least one of the sample of the signal power and the sample of the delayed signal power does not satisfy the threshold condition at the same time, the computation availability determination unit 36 determines that computation of the evaluation function is not performed.

The evaluation function computation unit 37 performs computation of the evaluation function using the sample of the signal power and the sample of the delayed signal power at the time for which the computation availability determination unit 36 determines that computation of the evaluation function is to be performed. The evaluation function computation unit 37 calculates a value of the evaluation function F(X) using Equation (3) when the first threshold determination unit 34 and the second threshold determination unit 35 use the first threshold condition, and calculates a value of the evaluation function F(X) using Equation (4) when the first threshold determination unit 34 and the second threshold determination unit 35 use the second threshold condition. The evaluation function computation unit 37 outputs information of the computation result indicating the calculated value of the evaluation function F(X) to the chromatic dispersion amount calculation unit 4.

The chromatic dispersion amount calculation unit 4 instructs the processing of the computation unit 3 to be repeated while sweeping and changing the value of the chromatic dispersion amount X in a suitable range. The chromatic dispersion amount calculation unit 4 calculates a true chromatic dispersion amount of the optical signal received by the coherent reception unit 2 based on the computation result of the evaluation function F(X) when different values of the chromatic dispersion amount X are used. Specifically, the chromatic dispersion amount calculation unit 4 selects the chromatic dispersion amount X when the evaluation function F(X) has a minimum value calculated by the computation unit 3 as a true chromatic dispersion amount.

Figure 4:
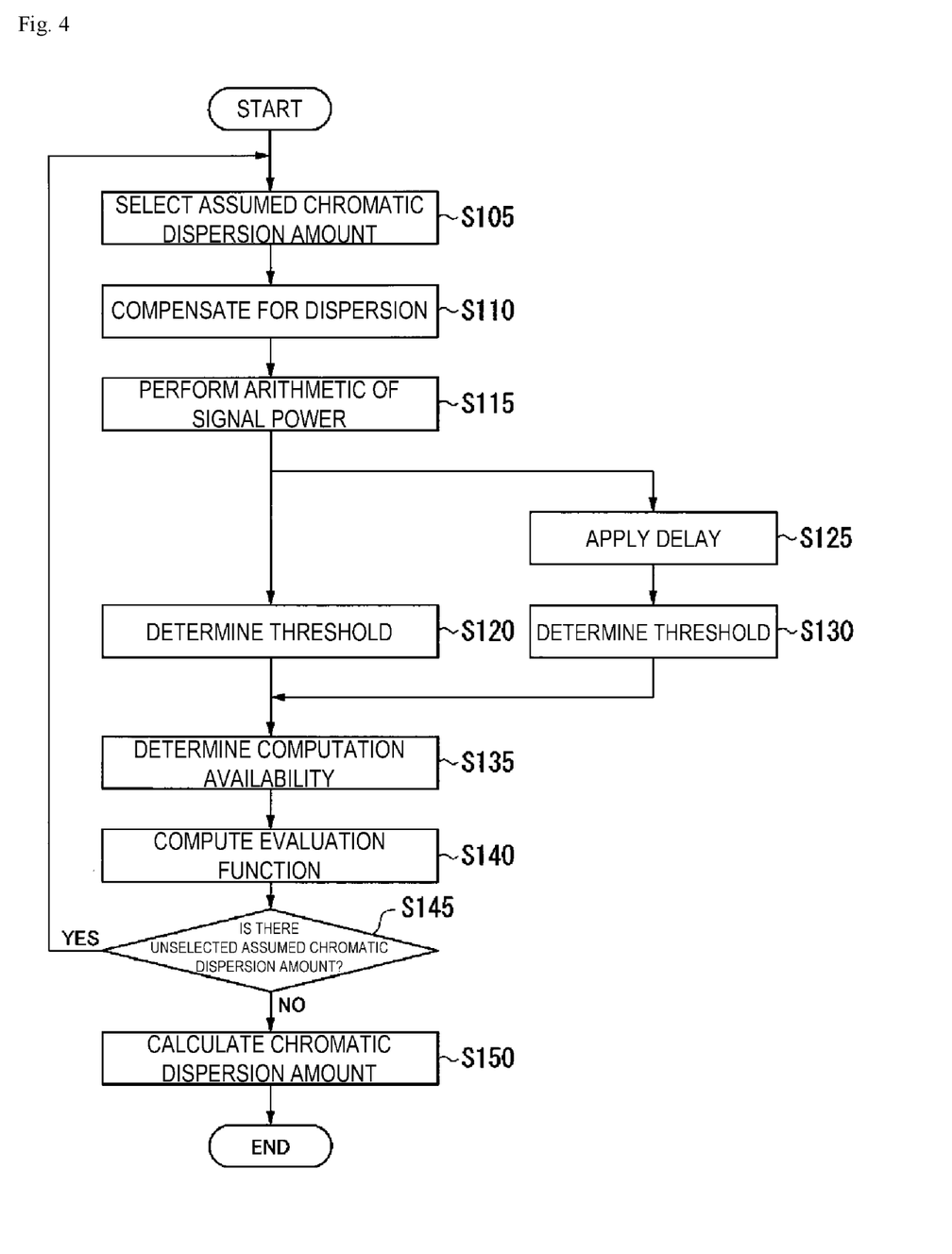
FIG. 4 is a flowchart illustrating processing of the chromatic dispersion amount calculation apparatus according to the embodiment.

FIG. 4 is a flowchart illustrating chromatic dispersion amount estimation processing performed by the chromatic dispersion amount calculation apparatus 1. The chromatic dispersion amount calculation apparatus 1 performs the processing of FIG. 4 after the coherent reception unit 2 coherently receives optical signals. A chromatic dispersion amount obtained by sweeping a sweep range will be described below as an assumed chromatic dispersion amount.

The chromatic dispersion amount calculation unit 4 selects an unselected assumed chromatic dispersion amount X among assumed chromatic dispersion amounts X within the sweep range. The chromatic dispersion amount calculation unit 4 outputs the selected assumed chromatic dispersion amount X to the computation unit 3 (step S105).

The dispersion compensation unit 31 of the computation unit 3 performs dispersion compensation on the electric field of the received signal sequence E(t) output by the coherent reception unit 2 using the assumed chromatic dispersion amount X to obtain a sample sequence $E_X(t)$ (step S110). The power arithmetic unit 32 performs arithmetic of a signal power $P_X(t)$ of the sample sequence $E_X(t)$ (step S115). The first threshold determination unit 34 determines whether each sample of the signal power $P_X(t)$ satisfies a threshold condition (step S120).

On the other hand, the delay applying unit 33 performs arithmetic of a delayed signal power $P_X(t-\tau)$ obtained by applying a delay $\tau$ for several samples to the signal power $P_X(t)$ (step S125). The second threshold determination unit 35 determines whether each sample of arithmetic result of the delayed signal power performed by the delay applying unit 33 satisfies a threshold condition (step S130). Further, the computation unit 3 may perform the processing of step S125 and step S130 in parallel with the processing of step S120, or may perform the processing of step S125 and step S130 before or after step S120.

The computation availability determination unit 36 determines whether computation of the evaluation function is to be performed based on the determination result from the first threshold determination unit 34 and the determination result from the second threshold determination unit 35 (step S135). In other words, when the sample of the signal power satisfies the threshold condition and the sample of the delayed signal power satisfies the threshold condition at the same time, the computation availability determination unit 36 determines that computation of the evaluation function is to be performed for the time. When at least one of the sample of the signal power and the sample of the delayed signal power does not satisfy the threshold condition at the same time, the computation availability determination unit 36 determines that computation of the evaluation function is not performed.

The evaluation function computation unit 37 performs computation of the evaluation function F(X) with Equation (3) or Equation (4) using the sample of the signal power and the sample of the delayed signal power at the time for which the computation availability determination unit 36 determines that computation of the evaluation function is to be performed (step S140).

In a case in which there is an unselected assumed chromatic dispersion amount X among the assumed chromatic dispersion amounts within the sweep range (YES in step S145), the chromatic dispersion amount calculation unit 4 returns to the processing of step S105. In addition, in a case in which it is determined that all of the assumed chromatic dispersion amounts X within the sweep range have been selected (NO on step S145), the chromatic dispersion amount calculation unit 4 performs the processing of step S150. The chromatic dispersion amount calculation unit 4 selects the assumed chromatic dispersion amount X when a minimum value of the computation result is obtained from the computation results of the evaluation function F(X) when the dispersion compensation is performed using each assumed chromatic dispersion amount X. The chromatic dispersion amount calculation unit 4 estimates that the selected assumed chromatic dispersion amount X is the true chromatic dispersion amount (step S150).

Figure 5:
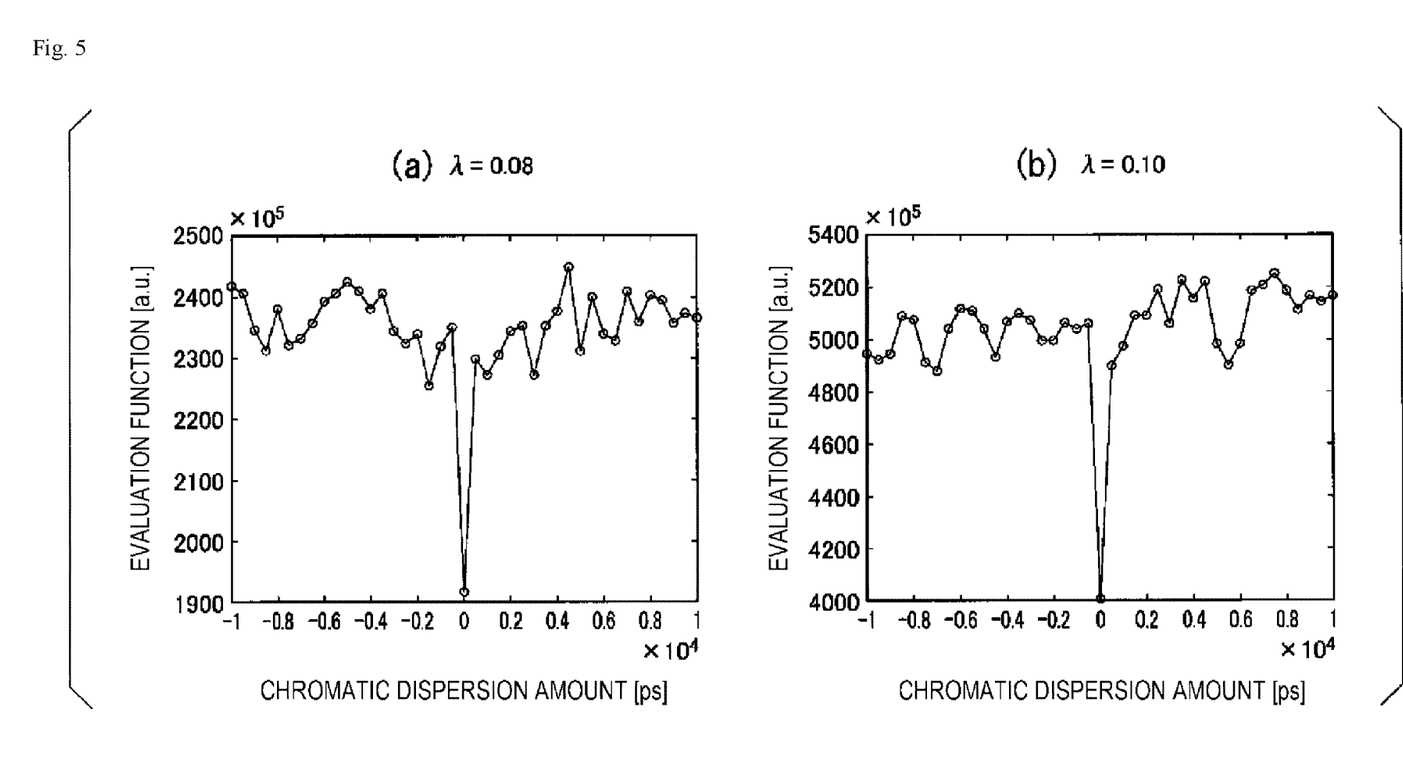
FIG. 5 is a diagram showing effects of the chromatic dispersion amount calculation apparatus according to the embodiment.

FIG. 5 is a diagram showing values of the evaluation function calculated by the chromatic dispersion amount calculation apparatus 1. FIGS. 5(a) and 5(b) show values of the evaluation function when λ is equal to 0.08 and 0.10, respectively. The true chromatic dispersion is 0 [ps]. FIGS. 5(a) and 5(b) show the results when state transitions have occurred within the threshold, that is, when Equation (3) is applied. It is ascertained that, when λ is equal to 0.08, the peak representing the minimum value appears more prominently as shown in FIG. 5(a) than in the result before application of Equation (3) shown in FIG. 2(b). In addition, it is ascertained that, when λ is equal to 0.10, the correct chromatic dispersion compensation amount can be estimated as shown in FIG. 5(b), unlike the results before application of Equation (3) shown in FIG. 2(c).

Figure 6:
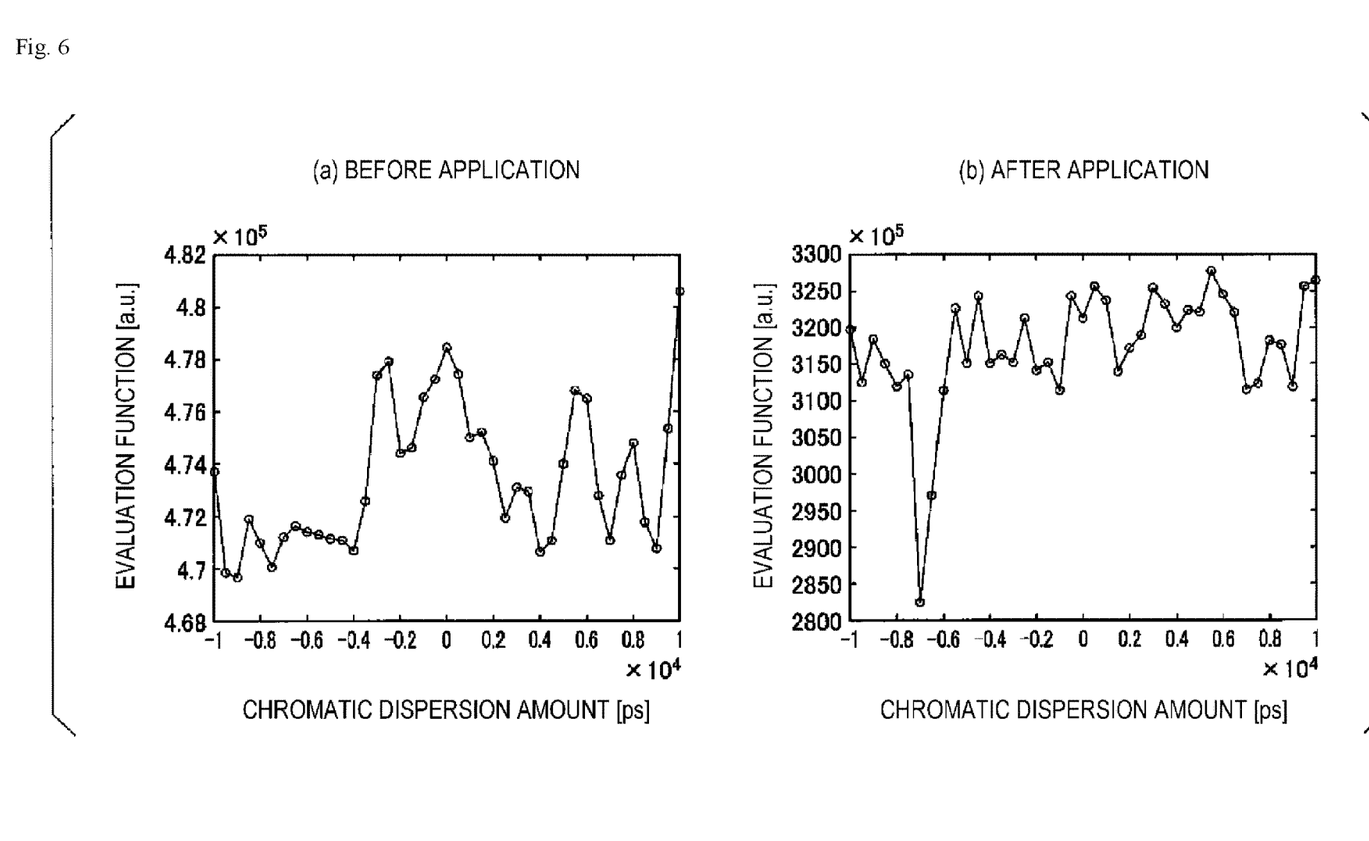
FIG. 6 is a diagram showing effects of the chromatic dispersion amount calculation apparatus according to the embodiment.

Similar verification was also performed when the chromatic dispersion amount was not zero. FIG. 6 is a diagram illustrating the values of the evaluation function when the chromatic dispersion amount is not zero. FIG. 6 shows the results of the case in which the delay-tap sampling estimation method was applied to the signals with λ equal to 0.10 and CD equal to 6800 [ps]. FIG. 6(a) shows the results prior to application of the present embodiment. FIG. 6(b) shows the values of the evaluation function of Equation (3) after the application of the present embodiment, that is, calculated by the chromatic dispersion amount calculation apparatus 1. In the results prior to the application of the present embodiment, there is no prominent peak indicating the minimum value of the evaluation function as shown in FIG. 6(a), and the chromatic dispersion amount cannot be estimated. On the other hand, it can be seen in the results after the application of the present embodiment that the minimum peak appears at the correct value as shown in FIG. 6(b), and the chromatic dispersion amount can be estimated correctly.

Figure 7:
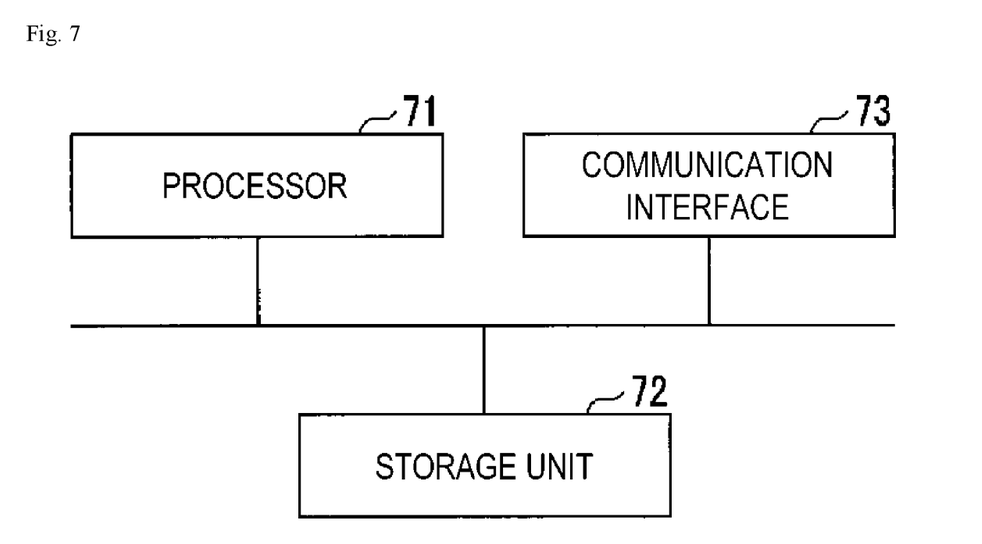
FIG. 7 is a diagram illustrating a hardware configuration of the chromatic dispersion amount calculation apparatus according to the embodiment.

A hardware configuration when the chromatic dispersion amount calculation apparatus 1 performs software processing will be described. FIG. 7 is an apparatus configuration diagram illustrating a hardware configuration example of the chromatic dispersion amount calculation apparatus 1. The chromatic dispersion amount calculation apparatus 1 includes a processor 71, a storage unit 72, and a communication interface 73. The processor 71 is, for example, a central processing unit (CPU). The processor 71 implements the functions of the computation unit 3 and the chromatic dispersion amount calculation unit 4 by reading and executing a program from the storage unit 72. The storage unit 72 stores programs and the like for performing processing of the computation unit 3 and the chromatic dispersion amount calculation unit 4. The storage unit 72 further includes a work area for the processor 71 to execute various programs and the like. Further, all or some functions of the computation unit 3 and the chromatic dispersion amount calculation unit 4 may be implemented using hardware such as an application specific integrated circuit (ASIC), a programmable logic device (PLD), or a field programmable gate array (FPGA). The communication interface 73 communicably connects to other apparatuses and implements the functions of the coherent reception unit 2 of the chromatic dispersion amount calculation apparatus 1.

According to the present embodiment, chromatic dispersion can be accurately estimated using the delay-tap sampling estimation by performing threshold processing on each power at the time of arithmetic of the evaluation function, even for a signal sequence with a high PAPR including a probabilistic shaping signal as described above.

According to the above-described embodiment, the chromatic dispersion amount calculation apparatus includes the computation unit and the chromatic dispersion amount calculation unit. The computation unit uses the difference between a signal power of an optical signal that is dispersion compensated with an assumed chromatic dispersion amount that is a chromatic dispersion amount assumed and a delayed signal power obtained by applying a delay to the signal power to compute an evaluation function for evaluating whether the assumed chromatic dispersion amount is the chromatic dispersion amount of the optical signal. The chromatic dispersion amount calculation unit calculates a chromatic dispersion amount of the optical signal based on the computation results of the evaluation function by the computation unit when each of a plurality of different values of the assumed chromatic dispersion amount is used.

The computation unit includes the dispersion compensation unit, the power arithmetic unit, the delay applying unit, the threshold determination unit, the computation availability determination unit, and the evaluation function computation unit. The dispersion compensation unit uses the assumed chromatic dispersion amount to compensate for the dispersion of the coherently received optical signal. The power arithmetic unit performs arithmetic of the signal power of the optical signal that is dispersion compensated. The delay applying unit performs arithmetic of the delayed signal power obtained by applying a predetermined delay to the signal power. The threshold determination unit determines whether the signal power and the delayed signal power satisfy a threshold condition. The computation availability determination unit determines whether computation of the evaluation function is to be performed based on the determination by the threshold determination unit. When the computation availability determination unit determines that the computation is to be performed, the evaluation function computation unit performs computation of the evaluation function using the signal power and the delayed signal power.

Further, the threshold determination unit determines whether each of a sample of the signal power and a sample of the delayed signal power at each time satisfy the threshold condition that is less than or equal to the predetermined threshold. Alternatively, the threshold determination unit determines whether each of the sample of the signal power and the sample of the delayed signal power at each time satisfy the threshold condition that is equal to or greater than the predetermined threshold.

In addition, the computation availability determination unit determines that computation is possible when the threshold determination unit determines that both the sample of the signal power and the sample of the delayed signal power at an identical time satisfy the threshold condition.

In addition, the evaluation function computation unit performs computation of the evaluation function using the sample that is determined to be able to be computed by the computation availability determination unit.

Although an embodiment of the present disclosure has been described in detail with reference to the drawings, a specific configuration is not limited to the embodiment, and includes designs or the like not departing from the gist of the present disclosure.

REFERENCE SIGNS LIST

1 Chromatic dispersion amount calculation apparatus
2 Coherent reception unit
3 Computation unit
4 Chromatic dispersion amount calculation unit
31 Dispersion compensation unit
32 Power arithmetic unit
33 Delay applying unit
34 First threshold determination unit
35 Second threshold determination unit
36 Computation availability determination unit
37 Evaluation function computation unit
71 Processor
72 Storage unit
73 Communication interface

The invention claimed is:
1. A chromatic dispersion amount calculation apparatus comprising:
   a computation unit configured to use a difference between a signal power of an optical signal that is dispersion compensated with an assumed chromatic dispersion amount that is a chromatic dispersion amount assumed and a delayed signal power obtained by applying a delay to the signal power to compute an evaluation function for evaluating whether the assumed chromatic dispersion amount is a chromatic dispersion amount of the optical signal; and
   a chromatic dispersion amount calculation unit configured to calculate the chromatic dispersion amount of the optical signal based on computation results of the evaluation function by the computation unit when a plurality of the assumed chromatic dispersion amounts that differ from each other are used,
   wherein the computation unit includes
   a dispersion compensation unit configured to perform dispersion compensation on a coherently received optical signal with the assumed chromatic dispersion amount,
   a power arithmetic unit configured to perform arithmetic of the signal power of the optical signal that is dispersion compensated,
   a delay applying unit configured to perform arithmetic of the delayed signal power obtained by applying a predetermined delay to the signal power, a threshold determination unit configured to determine whether the signal power and the delayed signal power satisfy a threshold condition, a computation availability determination unit configured to determine whether computation of the evaluation function is to be performed based on a determination of the threshold determination unit, and an evaluation function computation unit configured to perform computation of the evaluation function by using the signal power and the delayed signal power when the computation availability determination unit determines that the computation is to be performed.

2. The chromatic dispersion amount calculation apparatus according to claim 1, wherein the threshold determination unit determines whether samples of the signal power at times and samples of the delayed signal power at times satisfy a threshold condition that is less than or equal to a predetermined threshold.

3. The chromatic dispersion amount calculation apparatus according to claim 1, wherein the threshold determination unit determines whether samples of the signal power at times and samples of the delayed signal power at times satisfy a threshold condition that is equal to or greater than a predetermined threshold.

4. The chromatic dispersion amount calculation apparatus according to claim 1, wherein the computation availability determination unit determines that computation is possible when the threshold determination unit determines that both a sample of the signal power and a sample of the delayed signal power at an identical time satisfy the threshold condition.

5. The chromatic dispersion amount calculation apparatus according to claim 2, wherein the evaluation function computation unit performs computation of the evaluation function using a sample that is determined to be able to be computed by the computation availability determination unit.

6. A chromatic dispersion amount calculation method comprising:

using a difference between a signal power of an optical signal that is dispersion compensated with an assumed chromatic dispersion amount that is a chromatic dispersion amount assumed and a delayed signal power obtained by applying a delay to the signal power to compute an evaluation function for evaluating whether the assumed chromatic dispersion amount is a chromatic dispersion amount of the optical signal; and calculating the chromatic dispersion amount of the optical signal based on computation results of the evaluation function in the using when a plurality of the assumed chromatic dispersion amounts that differ from each other are used, wherein the using includes performing dispersion compensation on a coherently received optical signal with the assumed chromatic dispersion amount, performing arithmetic of the signal power of the optical signal that is dispersion compensated, performing arithmetic of the delayed signal power obtained by applying a predetermined delay to the signal power, determining whether the signal power and the delayed signal power satisfy a threshold condition, determining whether computation of the evaluation function is to be performed based on a determination in the determining whether the signal power and the delayed signal power satisfy a threshold condition, and performing computation of the evaluation function by using the signal power and the delayed signal power when the computation is determined to be performed in the determining whether computation of the evaluation function is to be performed.

* * * * *